(12) United States Patent
Mitsui

(10) Patent No.: US 9,047,032 B2
(45) Date of Patent: Jun. 2, 2015

(54) INFORMATION PROCESSING APPARATUS AND METHOD, AND CONTROL PROGRAM

(75) Inventor: Akihiro Mitsui, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 145 days.

(21) Appl. No.: 13/003,287

(22) PCT Filed: Aug. 4, 2009

(86) PCT No.: PCT/JP2009/003703
§ 371 (c)(1),
(2), (4) Date: Jan. 7, 2011

(87) PCT Pub. No.: WO2010/016234
PCT Pub. Date: Feb. 11, 2010

(65) Prior Publication Data
US 2011/0116131 A1    May 19, 2011

(30) Foreign Application Priority Data
Aug. 8, 2008    (JP) .................. 2008-205617

(51) Int. Cl.
G06F 3/12    (2006.01)
G06F 15/00    (2006.01)

(52) U.S. Cl.
CPC ............ *G06F 3/1284* (2013.01); *G06F 3/1205* (2013.01); *G06F 3/1255* (2013.01)

(58) Field of Classification Search
CPC ... G06F 3/1205; G06F 3/1253; G06F 3/1204; G06F 3/1296
See application file for complete search history.

(56) References Cited

U.S. PATENT DOCUMENTS

| 7,218,976 | B2 | 5/2007 | Minagawa |
| 7,720,044 | B1 | 5/2010 | Rainisto |
| 7,903,272 | B2 | 3/2011 | Kato |
| 2002/0065807 | A1 | 5/2002 | Kawamoto et al. |
| 2004/0216144 | A1 | 10/2004 | Mitsui |
| 2005/0088677 | A1* | 4/2005 | Hayashi ..................... 358/1.13 |
| 2005/0117180 | A1 | 6/2005 | Kato |
| 2005/0210227 | A1 | 9/2005 | Emerson et al. |

(Continued)

FOREIGN PATENT DOCUMENTS

| JP | 2000-225754 A | 8/2000 |
| JP | 2000-227847 A | 8/2000 |

(Continued)

OTHER PUBLICATIONS

Chinese Office Action dated Dec. 4, 2012 in Chinese Application No. 2009-80131015.9.

(Continued)

*Primary Examiner* — Thierry L Pham
(74) *Attorney, Agent, or Firm* — Fitzpatrick, Cella, Harper & Scinto

(57) ABSTRACT

An information processing apparatus for processing a print setting in a printer driver configured to generate data to be sent to and printed from a printing device, the information processing apparatus including storage unit configured to store constraint rules each defining a constraint for avoiding conflict between print settings; an instruction unit configured to instruct fixing of a print setting; and a rule priority setting unit configured to increase a priority of a constraint rule concerning a print setting for which fixing has been instructed is disclosed as an example.

41 Claims, 13 Drawing Sheets

(56) References Cited

U.S. PATENT DOCUMENTS

| | | | |
|---|---|---|---|
| 2006/0082802 A1 | 4/2006 | Furuya | |
| 2006/0103867 A1 | 5/2006 | Kato | |
| 2006/0167953 A1 | 7/2006 | Kawamoto et al. | |
| 2006/0204270 A1* | 9/2006 | Abe | 399/82 |
| 2006/0232811 A1* | 10/2006 | Yokoyama | 358/1.14 |
| 2007/0229886 A1 | 10/2007 | Sakurai | |
| 2007/0276781 A1 | 11/2007 | Kawamoto et al. | |
| 2008/0038032 A1 | 2/2008 | Suzue | |
| 2008/0055647 A1 | 3/2008 | Kotake | |
| 2008/0144087 A1* | 6/2008 | Mitsui | 358/1.15 |
| 2009/0231620 A1* | 9/2009 | Kaneko | 358/1.15 |

FOREIGN PATENT DOCUMENTS

| | | |
|---|---|---|
| JP | 2002-169669 A | 6/2002 |
| JP | 2002-328757 A | 11/2002 |
| JP | 2003-99170 A | 4/2003 |
| JP | 2004-021456 A | 1/2004 |
| JP | 2004007594 A | 1/2004 |
| JP | 2005-190467 A | 7/2005 |
| JP | 2006-24068 A | 1/2006 |
| JP | 2006-110861 A | 4/2006 |
| JP | 2006-115359 A | 4/2006 |
| JP | 2006115359 A | 4/2006 |
| JP | 2006-164253 A | 6/2006 |
| JP | 2007-249867 A | 9/2007 |
| JP | 2007249867 A | 9/2007 |
| JP | 2007-272779 A | 10/2007 |
| JP | 2008-059299 A | 3/2008 |
| JP | 2008-059484 A | 3/2008 |
| JP | 2008059484 A | 3/2008 |

OTHER PUBLICATIONS

European Search Report dated Nov. 2, 2012, in EP Application No. 09804721.0.

Chinese Office Action dated Dec. 4, 2012 in Chinese Application No. 200980131015.9.

* cited by examiner

Fig. 4

```xml
<?xml version="1.0" encoding="UTF-8" ?>
<sv:CommonComponent version="1.0">
  <sv:StatusVariable name="Collate" type="selection">
    <sv:PropertyTable>
      <sv:ValueInfoTable>
        <sv:DefaultValue name="Collated" />
        <sv:ValueSet name="Collated" />
        <sv:ValueSet name="Uncollated" />
      </sv:ValueInfoTable>
      <sv:ReasonInfoTable>
        <sv:ReasonSet reason="Collate_1" />
        <sv:ReasonSet reason="Collate_2" />
        <sv:ReasonSet reason="Collate_3" />
      </sv:ReasonInfoTable>
    </sv:PropertyTable>
    <sv:ConflictRules priority="51200">
     <sv:Conflict status="notavailable" reason="Collate_1" priority="10">
      <sv:Value name="Collated" />
      <sv:Condition name="Booklet" result="false">
        <sv:Value name="None" />
      </sv:Condition>
     </sv:Conflict>
     <sv:Conflict status="notavailable" reason="Collate_2" priority="20">
       <sv:Value name="Collated" />
       <sv:Block result="false">
         <sv:Condition name="CoverBack">
           <sv:Value name="NoCover" />
         </sv:Condition>
         <sv:Condition name="CoverFront">
           <sv:Value name="NoCover" />
         </sv:Condition>
       </sv:Block>
     </sv:Conflict>
     <sv:Conflict status="notavailable" reason="Collate_3" priority="30">
       <sv:Value name="Collated" />
       <sv:Condition name="Staple">
         <sv:Value name="SaddleStitch" />
       </sv:Condition>
     </sv:Conflict>
    </sv:ConflictRules>
  </sv:StatusVariable>
</sv:CommonComponent>
```

Fig. 8

```
<?xml version="1.0" encoding="UTF-8" ?>
<sv:CommonComponent version="1.0">
 <sv:StatusVariable name="Collate" type="selection" lock="true">
  <sv:PropertyTable>
   <sv:ValueInfoTable>
    <sv:DefaultValue name="Collated" />
    <sv:ValueSet name="Collated" />
    <sv:ValueSet name="Uncollated" />
   </sv:ValueInfoTable>
  </sv:PropertyTable>
 </sv:StatusVariable>
</sv:CommonComponent>
```

Fig. 9

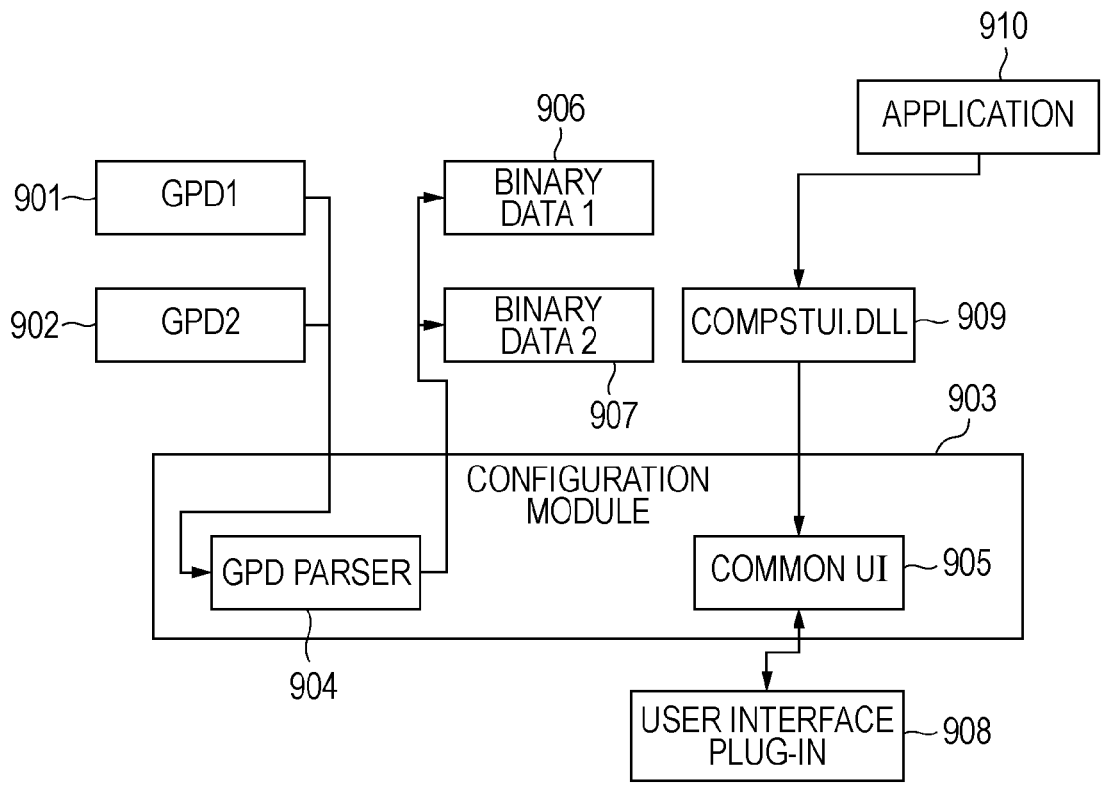

Fig. 10

```
*Feature: InputBin
{
        *rcNameID: =PAPER_SOURCE_DISPLAY
        *DefaultOption: AUTO
        *ConflictPriority: 30
        *Option: AUTO
        {
                *rcNameID: =CNINBIN_PRNDEFAULT_STR
        }
        *Option: INPUTTRAY_MANUAL
        {
                *rcNameID: =MANUAL_FEED_DISPLAY
        }
        *Option: INPUTTRAY_CASSETTE1
        {
                *rcNameID: =CNINBIN_DRAWER1_STR
                *Constraints: PaperSize.JAPANESE_POSTCARD
        }
        *Option: INPUTTRAY_CASSETTE2
        {
                *rcNameID: =CNINBIN_DRAWER2_STR
                *Constraints: PaperSize.JAPANESE_POSTCARD
        }
}
*InvalidCombination:       LIST(PaperSize.JAPANESE_POSTCARD,
InputBin.INPUTTRAY_CASSETTE1)
*InvalidCombination:       LIST(PaperSize.JAPANESE_POSTCARD,
InputBin.INPUTTRAY_CASSETTE2)
```

```
*Feature: InputBin
{
        *rcNameID: =PAPER_SOURCE_DISPLAY
        *DefaultOption: AUTO
        *ConflictPriority: 30
        *LockOption: TRUE
        *Option: AUTO
        {
                *rcNameID: =CNINBIN_PRNDEFAULT_STR
        }
}
```

Fig. 14

```
<?xml version="1.0" encoding="UTF-8" ?>
<psf:PrintTicket
xmlns:psf="http://schemas.microsoft.com/windows/2003/08/printi
ng/printschemaframework"
xmlns:xsi="http://www.w3.org/2001/XMLSchema-instance"
xmlns:xsd="http://www.w3.org/2001/XMLSchema" version="1"
xmlns:psk="http://schemas.microsoft.com/windows/2003/08/printi
ng/printschemakeywords">
  <psf:Feature name="psk:PageMediaSize">
    <psf:Option name="psk:NorthAmericaLetter">
      <psf:ScoredProperty name="psk:MediaSizeWidth">
        <psf:Value xsi:type="xsd:integer">215900</psf:Value>
      </psf:ScoredProperty>
      <psf:ScoredProperty name="psk:MediaSizeHeight">
        <psf:Value xsi:type="xsd:integer">279400</psf:Value>
      </psf:ScoredProperty>
    </psf:Option>
  </psf:Feature>
  <psf:Feature name="psk:PageOrientation">
    <psf:Option name="psk:Portrait" />
  </psf:Feature>
  <psf:ParameterInit name="psk:JobCopiesAllDocuments">
    <psf:Value xsi:type="xsd:integer">1</psf:Value>
  </psf:ParameterInit>
</psf:PrintTicket>
``` ic field

The present invention relates to a print control program including a printer driver.

BACKGROUND ART

In order to print files including documents and figures created on a computer which is an example of an information processing apparatus through an application, drawing data is converted into printer language data using a printer driver and is then sent to a printer. Settings such as paper type, duplex printing, color printing, and paper feed tray are print settings on a user interface provided by the application or the printer driver, and data set by a user is sent to the printer as a printer command.

The number of functions of printer drivers has been increasing year by year. There are also quite a few printer drivers having several hundreds of functions. A user interface for performing print setting for a printer driver has a plurality of dialog windows that are opened by pressing a button on the user interface. This may confuse many users as to where in those windows the users are allowed to make a desired setting. Accordingly, a printer driver provides function constraint processing (conflict processing) to help users use functions. The term "function constraint processing" refers to disabling other functions when a certain function is selected or changing other setting values or functions in accordance with the selection of a certain function. In many printer drivers, for example, the simultaneous setting of "postcard" and "stapling" is unacceptable. When "postcard" is selected, the item "stapling" is made inactive or grayed out on the user interface of the printer drivers (PTL 1). Further, an item that cannot be set is hidden to prevent user selection, or an icon indicating that the item is not selectable is displayed (PTL 2). Further, a warning message about an item that cannot be set is displayed (PTL 3).

Furthermore, the constraint processing of printer drivers is performed not only using the display on a user interface but also using an application program to change print settings. In some cases, a setting that is in the constraint state may be directly passed from an application to a printer driver. In such cases, if the printer driver converts the setting into a printer command, an error occurs in the printer. Therefore, the printer driver performs function constraint processing also during printing to change a print setting to a value so that printing can be performed.

Meanwhile, due to the increased consciousness about security, reduction in cost, and the like, there is a demand to fix a specific function of print settings. For example, if the monochrome printing setting is fixed in a color printer, the cost of toner or ink required for printing can be reduced. For example, if the 2-Up printing setting for allowing two pages to be printed on one page at a reduced size or the duplex printing setting for allowing printing on both sides is fixed, the number of sheets can be reduced.

However, the function for fixing a value may often conflict with the constraint processing. For example, if the duplex printing setting is fixed, a problem may occur in that it is difficult to determine what constraint is to be applied when a sheet type that is not suitable for duplex printing is selected. In the related art, a method of customizing a printer driver itself to create a different dedicated driver has been generally adopted. This requires a printer driver to be created for each user's demand. Another possible solution is to add a new constraint processing rule from an external plug-in (PTL 4). Further possible methods include a method of attempting to fix as many settings as possible and changing a print setting when the changing of the setting can be made by the constraint processing (PTL 5). There is a technique for automatically complementing the constraint processing rule opposite to a currently held constraint processing rule.

Further, the developer can describe all rules that are active or turned on for a certain function name and can, as described above, omit a rule that is inactive or turned off. A rule that is turned off is automatically generated by an inference engine. Conversely, the developer can describe all rules that are turned off for a certain function name and can, as described above, omit a rule that is turned on. A rule that is turned on is automatically generated by the inference engine. The developer can also describe all rules that are turned on and turned off for a certain function name. In this case, no rules are automatically generated. When a term is described in the left side using the "function name (ON), function name (OFF)" form and an item is described in the right side, the same on/off form as that in the left side is used. In this case, a rule is automatically generated (PTL 6).

In the methods of the related art, however, it is difficult to perfectly fix values. When a constraint processing rule is inserted from an external plug-in, it is necessary for the external plug-in to have knowledge about all constraint processing rules (also referred to as "conflict rules") of a printer driver in advance. Further, the functions of the main body of the printer driver may be extended and the constraint processing may also be extended. In this case, it is also necessary to insert a new, changed constraint processing rule from the external plug-in. In addition, in a case where a change may be permitted in the constraint processing, depending on the value that is fixed, all values may not necessarily be fixed with certainty. When an opposite rule is automatically complemented, the method disclosed in PTL 6 only allows automatic complement of a rule in which a setting value is turned on or off. For example, when there is a constraint processing rule for turning on the duplex printing setting, a constraint processing rule for turning off the duplex printing setting is automatically complemented. In order to avoid inconvenience of a constraint processing rule when a setting value is fixed, a rule for changing a rule to be automatically complemented to a fixed value may be added. However, if a value is changed according to a previously evaluated constraint processing rule, the value could not possibly be fixed as intended by the developer or user. Further, the above rule is not applicable to a setting having two or more setting values, for example, paper size. Another problem is that when a plurality of preset setting values that are saved by a user, such as those in "My Favorite", are applied, if a fixed setting value and a value that is different from the fixed setting value are included in "My Favorite", the value may be changed and it is difficult to ensure that the value can be fixed.

CITATION LIST

Patent Literature

PTL 1: Japanese Patent Laid-Open No. 2003-99170
PTL 2: Japanese Patent Laid-Open No. 2000-227847
PTL 3: Japanese Patent Laid-Open No. 2000-225754
PTL 4: Japanese Patent Laid-Open No. 2005-190467
PTL 5: Japanese Patent Laid-Open No. 2007-272779
PTL 6: Japanese Patent Laid-Open No. 2002-169669

SUMMARY OF INVENTION

For example, an information processing apparatus for processing a print setting in a printer driver configured to generate data to be sent to and printed from a printing device, the information processing apparatus including storage unit configured to store constraint rules each defining a constraint for avoiding conflict between print settings; an instruction unit configured to instruct fixing of a print setting; and a rule priority setting unit configured to increase a priority of a constraint rule concerning a print setting for which fixing has been instructed, is disclosed.

Other features and advantageous of the present invention will be apparent from the following description taken in conjunction with the accompanying drawings, in which like reference characters designate the same or similar parts throughout thereof.

BRIEF DESCRIPTION OF DRAWINGS

FIG. 4 is a diagram showing a part of the format of an XML file contained in a model-dependent file according to the first embodiment of the present invention.

FIG. 8 is a diagram showing a part of an XML file contained in the model-dependent file according to the first embodiment of the present invention, in which the lock function is active.

FIG. 9 is a schematic block diagram of a configuration module according to a second embodiment of the present invention.

FIG. 10 is a diagram showing a part of a GPD file which is a model-dependent file according to the second embodiment of the present invention.

FIG. 14 is a diagram showing an XML file of a print ticket of a print setting according to an embodiment of the present invention.

DESCRIPTION OF EMBODIMENTS

First Embodiment

An embodiment of the present invention will now be described with reference to the drawings.

Figure 1:
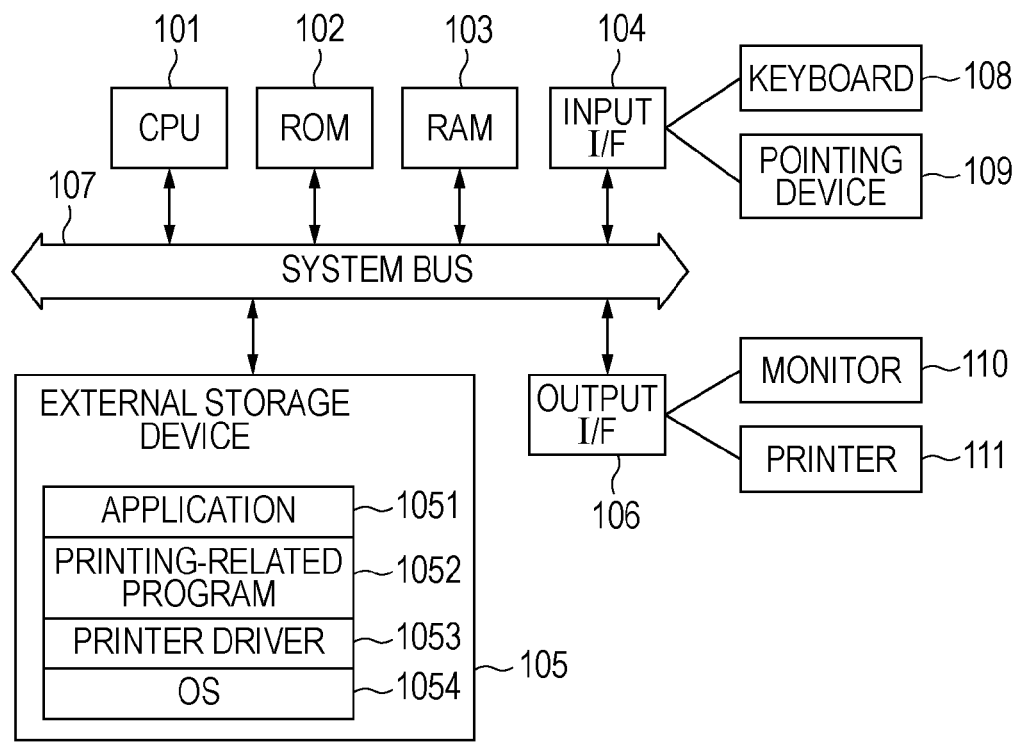
FIG. 1 is a schematic hardware and software block diagram of a computer system according to an embodiment of the present invention.

FIG. 1 is a schematic block diagram of a print processing system according to an embodiment of the present invention. It is to be understood that the present invention can be applied to any of a system including a single function, a system including a plurality of devices, and a system in which a connection is established via a network such as a local area network (LAN) or wide area network (WAN) so that a process can be performed, unless otherwise stated, as long as the functions of the present invention can be executed.

In the schematic block diagram shown in FIG. 1, a computer-based system is illustrated. A central processing unit (CPU) 101 controls the overall operation of an apparatus according to a program stored in a read-only memory (ROM) 102, a random access memory (RAM) 103, or an external storage device 105. The RAM may also be used as a work area when the CPU 101 performs various processes. The external storage device 105 records an operating system (OS) 1054, application software 1051, and the like. An input device such as a keyboard 108 or a mouse (pointing device) 109 is a device for allowing a user to give various instructions to the computer through an input/output interface (I/F) 104. An output I/F 106 is an interface for outputting data to the outside, and is configured to output data to a monitor 110 or a printer 111. The output I/F 106 may be connected to the printer 111 via a local input/output (I/O) line, which is used for direct connection, or via a network such as a LAN or a WAN. A system bus 107 is a common data bus through which data is exchanged between the individual units. Modules shown in FIGS. 2, 3, and 9 are stored as a printer driver 1053 in the external storage device 105 shown in FIG. 1, and the CPU 101 loads the modules into the RAM 103 and executes them.

Figure 2:
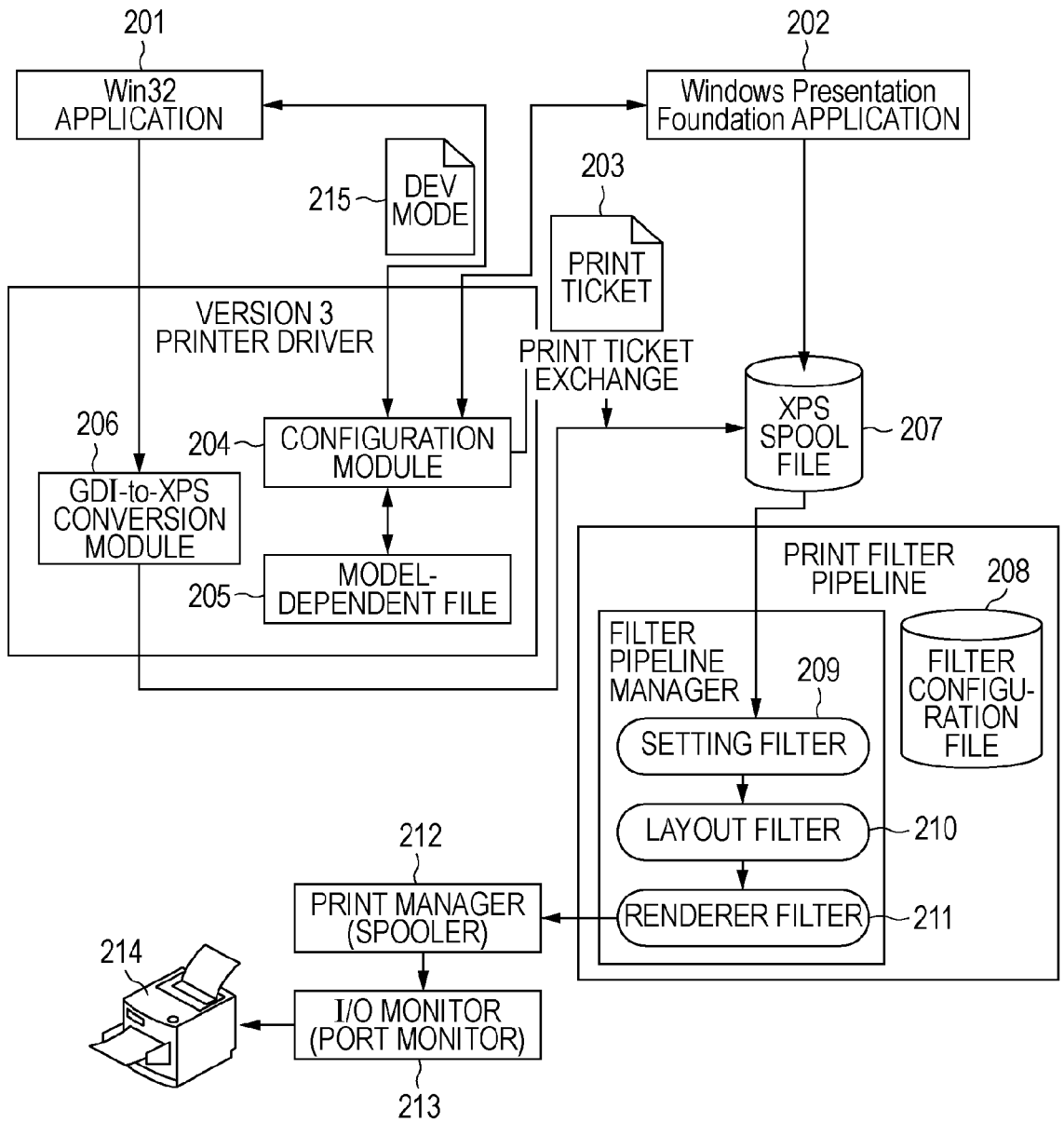
FIG. 2 is a schematic block diagram of an XPSDry printing system according an embodiment of the present invention.
Figure 3:
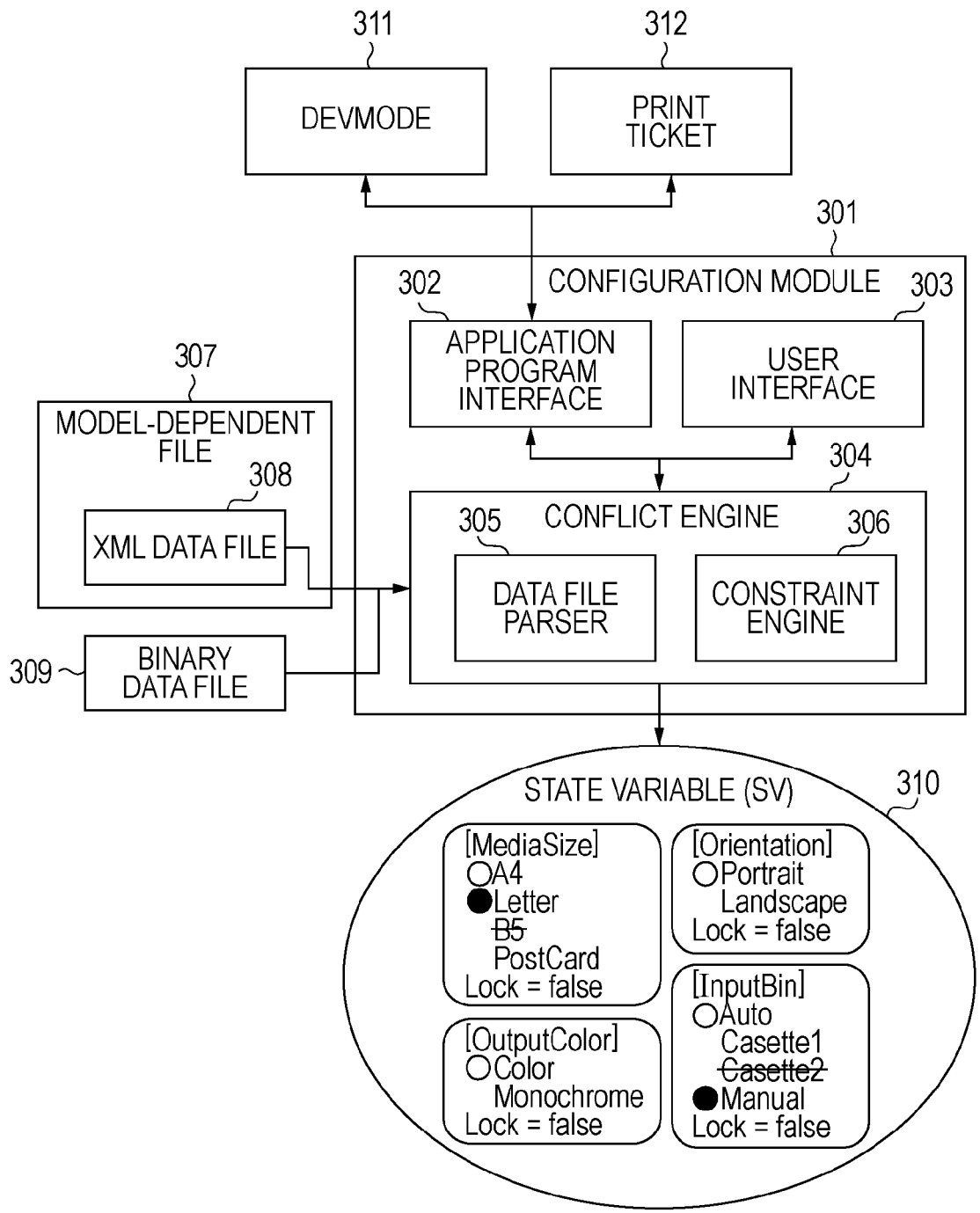
FIG. 3 is a schematic block diagram of a configuration module according to a first embodiment of the present invention.

FIG. 2 is a schematic block diagram of an XPSDry printing system. The term "XPSDrv" refers to a printer driver configured to perform printing using a document file format called Extensible Markup Language Paper Specification (XPS) as spool data. A user uses an input device such as a keyboard or a mouse to execute a print process using a Win32 application program (hereinafter referred to as "Win32 application") 201 or a Windows (registered trademark) Presentation Foundation application program (hereinafter referred to as "WPF application") 202 which is displayed on a monitor of an output device. The print process may be executed by performing the following three processes in sequence: selecting a printer, creating a print setting, and performing conversion of drawing data. Items 201 to 213 and 215 shown in FIG. 2 are stored in the external storage device 105 shown in FIG. 1.

Figure 13:
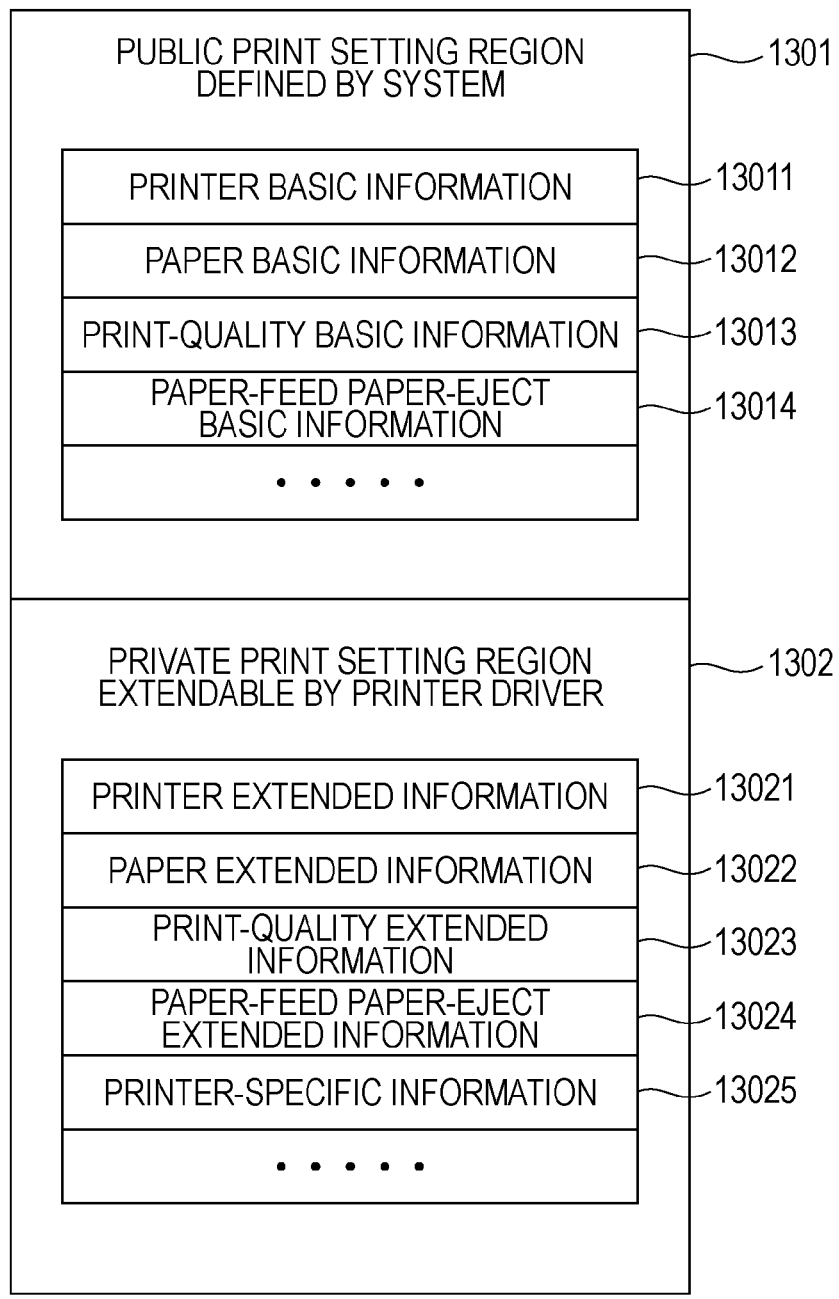
FIG. 13 is a diagram showing a binary DEVMODE structure of a print setting according to an embodiment of the present invention.
Figure 15:
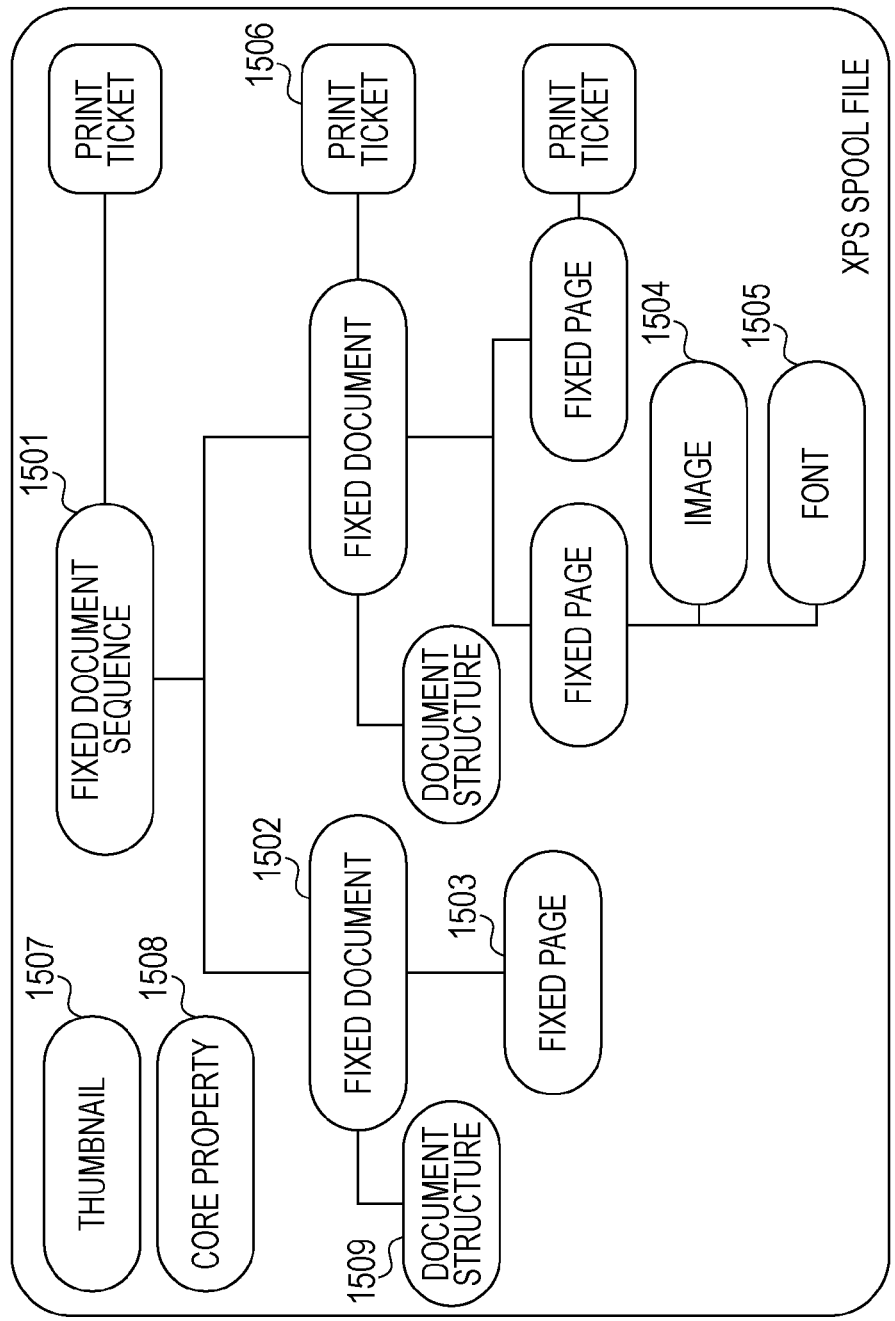
FIG. 15 is a block diagram of an XPS spool file according to an embodiment of the present invention.

First, a user instructs selection of a desired printer 214 using the mouse or the like. That is, a user instructs selection of a printer driver corresponding to a printer that performs printing. Then, the user instructs creation of a print setting. First, an application reserves a memory for a print setting. Then, an application (the Win32 application 201 or the WPF application 202) or a configuration module 204 of a printer driver fills the reserved memory area with setting data using a model-dependent file 205. Accordingly, the application performs print setting. The Win32 application 201 uses a binary DEVMODE structure 215 as print setting data, and the WPF application 202 uses a print ticket 203 which is described in extensible markup language (XML). The DEVMODE structure 215 has a structure shown in FIG. 13. The DEVMODE structure 215 is a binary structure having a public region that is defined by the operating system and a private region that is uniquely defined by the printer driver. The print ticket 203 may be print setting information described in an XML format shown in FIG. 14. The DEVMODE structure 215 or the print ticket 203 holds a print setting. The print ticket 203 is directly rewritten by the WPF application 202 to change the print setting. A dedicated setting dependent on the printer 214 is performed by displaying a user interface of the printer driver held in the configuration module 204 and operating the user interface by the user. The printer driver changes the setting dependent on the printer 214 in the DEVMODE structure 215 or the print ticket 203 according to the setting of the user interface. Specific examples of print setting include setting the output paper size to "A4", performing duplex printing, switching a printing mode between color printing and monochrome printing, and specifying a paper feed tray. Since the print ticket 203 is configured such that print settings are described in the XML format, it is easy for the WPF application 202 to directly change and update all the setting values. Alternatively, as in the related art, a setting may be changed using a user interface of a printer driver.

Finally, the printer driver performs conversion of drawing data. When the print setting is established, the user executes a print process through the application. When printing is performed through the Win32 application 201, the drawing data is sent to a Graphics Device Interface (GDI)-to-XPS conversion module 206 having the form of a version 3 printer driver, and an XPS spool file 207 is created. The version 3 printer driver is a printer driver compatible with Microsoft (registered trademark) Windows (registered trademark) 2000 or later. In this case, the GDI-to-XPS conversion module 206 calls the configuration module 204, and converts the print setting from the DEVMODE structure 215 to the print ticket 203. When printing is performed through the WPF application 202, two methods are available: generating an XPS file using the WPF application 202 and generating an XPS file using the operating system in accordance with an instruction from the WPF application 202. In both methods, the XPS spool file 207 is generated. Therefore, a feature of the XPS-Dry printing system is to always generate the XPS spool file 207 at the time of printing.

When the XPS spool file 207 is generated, the process is passed to a print filter pipeline process. The print filter pipeline process is a mechanism in which data to be printed is caused to pass through a plurality of filters to thereby perform printing. Specifically, the print filter pipeline process controls the number and order of filters using a filter configuration file 208. A filter pipeline manager that operates on the context of the print filter pipeline process performs processes according to the filter configuration file 208, in the present embodiment, in the order of a setting filter 209, a layout filter 210, and a renderer filter 211. The process is performed by delivering the XPS spool file 207 to the filters 209 to 211. Each of the filters 209 to 211 modifies the XPS spool file 207 and passes the modified XPS spool file 207 to the next filter. Accordingly, the process proceeds. Finally, the XPS spool file 207 is output in a printer control language (hereinafter referred to as PDL (Page Description Language)) format which is a printer-readable data language format. If the printer 214 is capable of directly reading the XPS spool file 207, the XPS spool file 207 may be output in the XPS format. The setting filter 209 performs a process of reading the print ticket 203 and writing data necessary for printing into the print ticket 203. The layout filter 210 performs layout-related processes such as changing the magnification, performing imposition layout for bookbinding, and stamping. The layout filter 210 operates in accordance with the print ticket 203 of the print setting included in the XPS spool file 207. Thus, for example, when the print ticket 203 has no imposition setting, the XPS spool file 207 passes through the layout filter 210 so as not to be subjected to the operation of the layout filter 210, and is directly passed to the next filter. Finally, the renderer filter 211 renders the XPS spool file 207 and converts it into PDL data. The PDL data is managed by a print manager 212 configured to perform schedule management of print processes, and print jobs are sequentially registered in queue. When the printer 214 is ready for printing, the PDL data is sent through an I/O monitor 213 in the order in which the print jobs are registered in the queue. In this manner, the printer driver plays a main role of converting print data from the application into printer language data, and an actual print process is performed.

FIG. 3 is a block diagram of the configuration module 204 of the printer driver in the present embodiment. A configuration module 301 operates by reading a model-dependent file 307 having information dependent on the model of each printer. Accordingly, the configuration module 301 can operate in a manner specific to each model even when the configuration module 301 is a module that is common to all printers. The model-dependent file 307 has an XML data file 308 in which actual model data is described. The configuration module 301 is further configured such that a data file parser 305 in a conflict engine 304 interprets and reads the XML data file 308.

The XML data file 308 may be a large data file including printer model data. In the model-dependent file 307, therefore, the XML data file 308 is compressed using ZIP compression technology so that the file size can be reduced. Once the data file parser 305 reads the XML data file 308, the data file parser 305 creates a binary data file 309. After creating the binary data file 309, the data file parser 305 operates using the binary data file 309, instead of the XML data file 308, unless the XML data file 308 is changed. This can reduce the operation of causing the data file parser 305 to load the XML data file 308 from the model-dependent file 307 and the operation of causing the data file parser 305 to analyze the XML data file 308, resulting in an increase in performance. If the XML data file 308 is changed, the XML data file 308 is read again and a binary data file 309 is created.

The data file parser 305 in the conflict engine 304 reads the XML data file 308 or the binary data file 309 and creates object instances of state variables (also referred to as "status variables": hereinafter abbreviated as "SVs") 310. The SVs 310 represent the states of print setting information, where each function of a printer is handed as an object. The SVs 310 are objects to be loaded on a memory, and have a name, a value or a list of values, a property attached to the value, a current value, a default value, a status, a reason, and a lock flag.

In the example of FIG. 3, for example, the SVs 310 relate to the function "paper size available in the printer". The SV 310 of the paper size has the name "Media Size", and, as a list of values, paper sizes available in the printer, such as "A4", "Letter", "B5", and "Postcard". In FIG. 3, a current value is indicated by a black circle and a default value is indicated by a white circle. In the illustration, therefore, the "A4" size is set in default and the "Letter" size is currently selected. The SVs 310 further have a status and can indicate whether a value corresponding to the status is available in the current setting. The SVs 310 and each value in the list of values have each a status. In FIG. 3, since the "B5" size is not available in the current setting, the value of the "B5" size is marked with a strikethrough, which represents a "not-available" status. In a situation where no paper size can be selected, the "Media Size" can be assigned the "not-available" status. Similarly, "Orientation" representing print orientation, "Output Color" representing color printing, and "Input Bin" representing a paper feed tray are further provided by way of example. A number of other functions may also be provided. The SVs 310 can have, instead of a list of values, a number or a character string as a value. Alternatively, an SV 310 of the so-called multi-section type that has a plurality of current values as a list of values can be created. In the SV 310 of the multi-section type, a plurality of values are selected at the same time. Thus, print settings that are stored in a plurality of boxes at the same time by a single printing action can be created by using a box saving function for saving print jobs in a storage device of a printer or any other function.

A constraint engine 306 performs constraint processing using the SVs 310. A constraint is a rule for avoiding conflict between print settings. For example, conflict occurs in "duplex printing ON, OHP ON". Thus, a rule is defined such that one of the settings is changed to the "OFF" state. This will be described in detail below. The constraint engine 306 changes the values of the SVs 310 on the basis of constraint processing rules described in the XML data file 308 or the binary data file 309. A constraint processing rule is described for each SV 310, and describes the relationship with a value of another SV 310. For example, a constraint processing rule of SV "Collate" for sorting pages in certain order will now be considered. Such sorting is required for bookbinding printing. This logic is described as a constraint processing rule of the SV "Collate". Then, the description may read "if bookbinding SV "Booklet" is turned on, then SV "Collate" is turned on". A reason can also be set in each constraint processing rule. The reason may be a mark which is applied to each SV 310, when the value is changed according to a constraint processing rule, in order to identify a constraint processing rule according to which the value has been changed. In each constraint processing rule, furthermore, as a result of conditions described therein, not only a value can be changed but also a status can be changed or a specific value can be deleted from or added to a list of values.

The configuration module 301 can receive or output a print setting, in the form of DEVMODE 311 or print ticket 312, from or to an application program (the Win32 application 201 or the WPF application 202) through an application program interface (API) 302. The configuration module 301 collects all current values of the SVs 310 to create the DEVMODE 311 or the print ticket 312 as an entire print setting, and outputs the DEVMODE 311 or the print ticket 312 to the application program. Upon receipt of the DEVMODE 311 or the print ticket 312 as an input, the values contained therein is set in the SVs 310, and constraint processing is performed using the conflict engine 304.

The configuration module 301 also includes a user interface 303 for allowing a user to perform print setting. On the user interface 303, the current values of the SVs 310 are displayed. When the user changes a value, the configuration module 301 sets value in the corresponding SV 310, and performs constraint processing using the conflict engine 304. As a result of the constraint processing, the SV 310 is changed to a new value, and the current value of the SV 310 is displayed on the user interface 303. The user interface 303 changes control display in accordance with the status of the SV 310. Each SV 310 has four statuses: "available", "not-available", "not-supported", and "not-permission", resulting in different control displays being provided. For the "available" status, normal display is performed. For the "not-available" or "not-permission" status, control or option is inactive or grayed out so as to prevent user selection. For the "not-supported" status, control is hidden from the user. When a button for returning to standard settings is pressed, the value of the SV 310 is changed to the default value and constraint processing is performed to display the state of the SV 310 on the user interface 303. Accordingly, regardless of the input or output form, the configuration module 301 performs processing after performing conversion into the SVs 310, thereby performing centralized management of functions and constraint processing rules.

Figure 6:
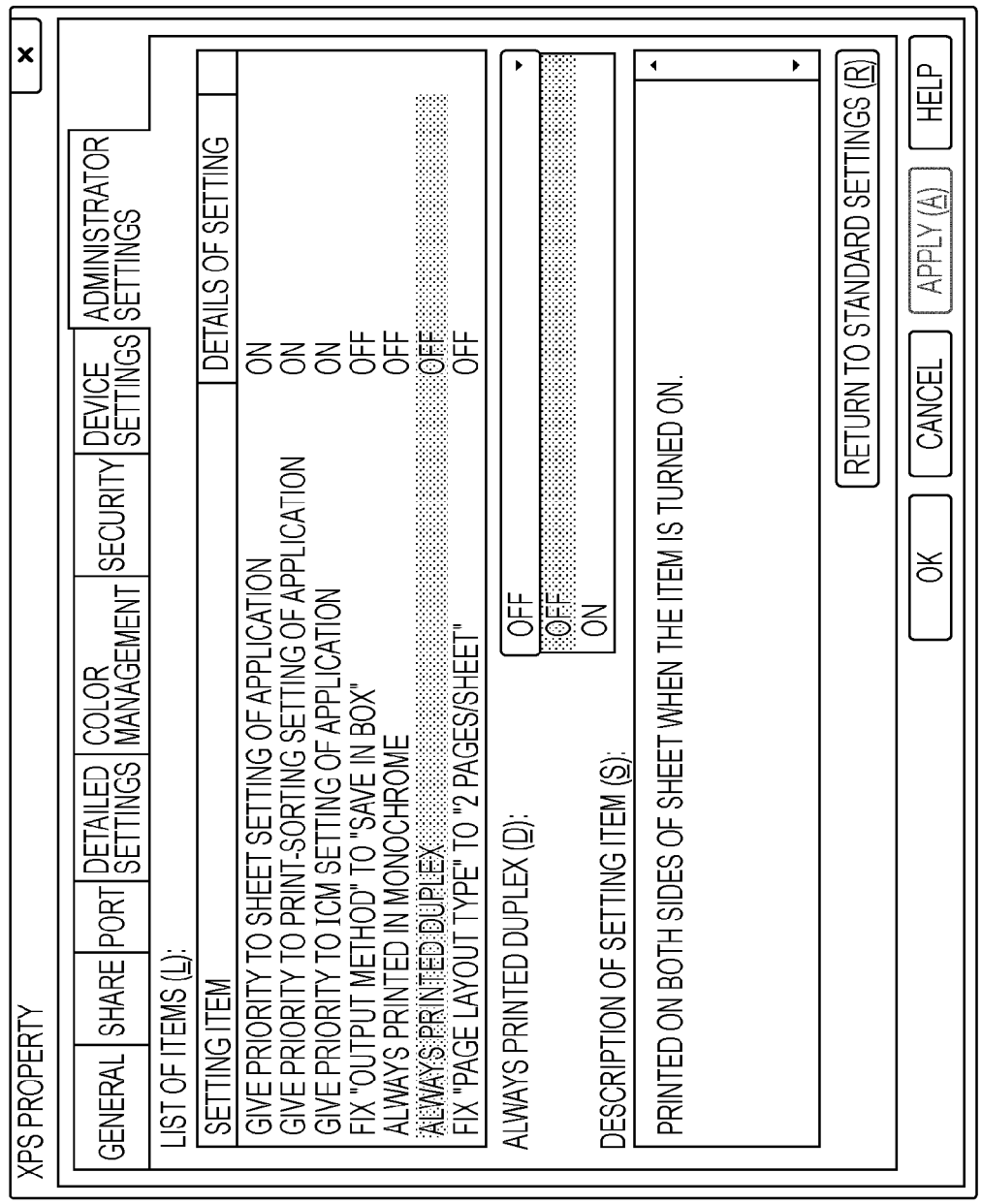
FIG. 6 is a diagram showing a part of a user interface screen for specifying a lock function according to the first embodiment of the present invention.
Figure 7:
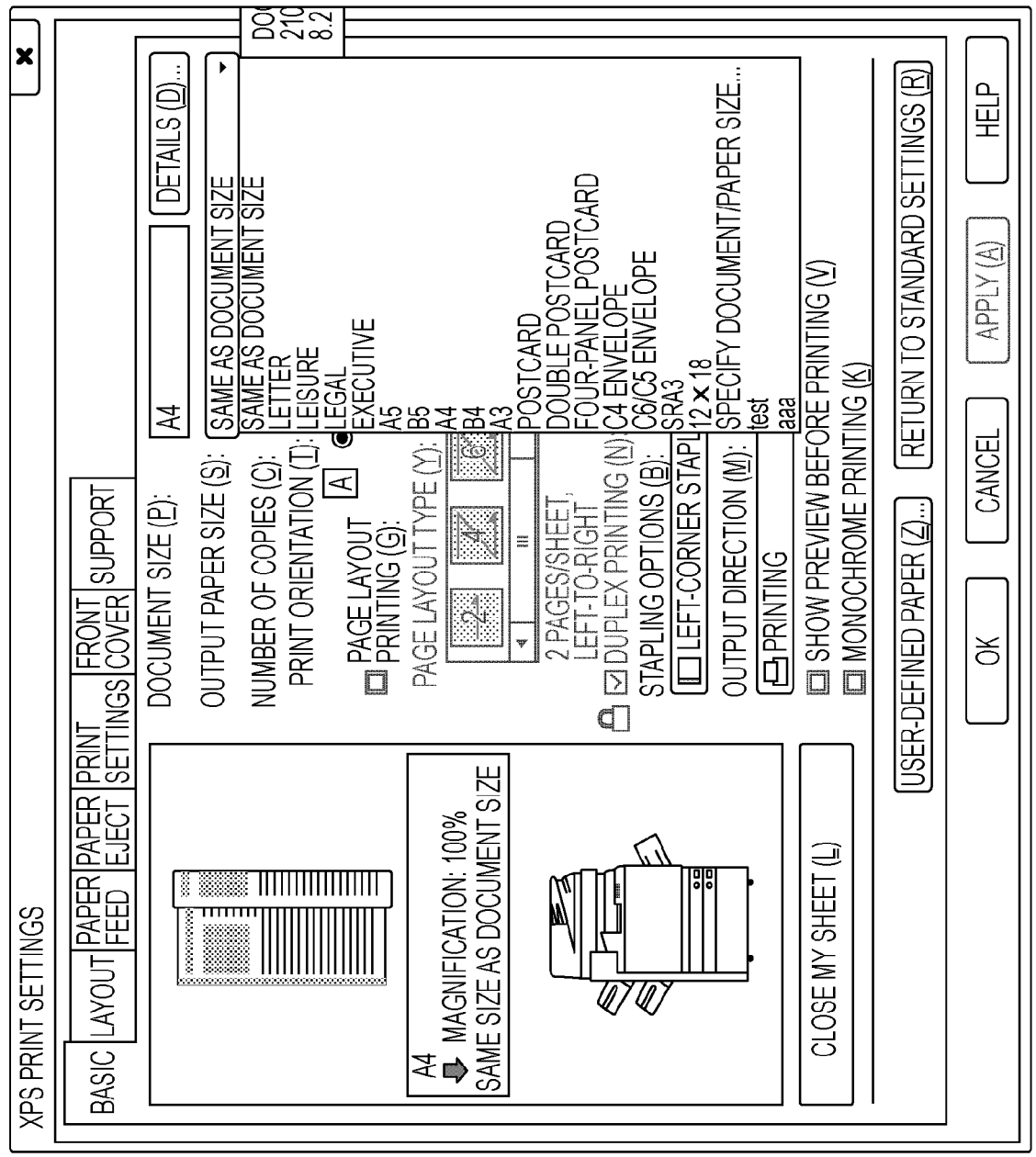
FIG. 7 is a diagram showing a print setting screen on which the lock function has been specified according to the first embodiment of the present invention.

Each SV 310 further has a special function, namely, a lock function for fixing a value or a list of values. The lock flag of the SV 310 is turned on, thus preventing the value of the SV 310 from being changed from outside or changed according to a constraint processing rule. In order to turn on the lock function, the user or administrator enters a description in advance in the XML data file 308 or the binary data file 309 (FIG. 8), or the user or administrator specifies the lock function using the API 302 or the user interface 303. FIG. 6 shows a display area on the user interface 303 for turning on or off the lock function. Only a user who has an administrator right is permitted to specify the lock function. In the display area shown in FIG. 6, the "duplex printing" setting is locked. FIG. 7 shows a display image on the user interface 303 when the lock function is turned on. In FIG. 7, since the duplex printing setting is locked, the duplex printing setting is always turned on and control is inactive or grayed out so as to prevent user operation. Further, in order to show the locked state, a lock-specific key mark is displayed beside the control on a display. When the control being locked or the lock-specific key mark is pointed using a pointing device, tooltips are displayed and the fixing of the setting is displayed on the display.

FIG. 4 shows a part of the XML data file 308. The XML data file 308 contains information about the SVs 310 and constraint processing rules corresponding to the functions of the printer. In FIG. 4, in particular, a portion containing the SV 310 of "Collate" is illustrated. The SV 310 is defined by an element called "StatusVariable". Here, the name of the SV 310 is defined using the "name" attribute, and the type of the SV 310 is defined using the "type" attribute. In FIG. 4, "Collate" is described in the "name" attribute, and "selection" is described in the "type" attribute. The "selection" type indicates an SV 310 that uses a list of values. Next, a "PropertyTable" element and a "ConflictRules" element are described as definitions of the SV 310. The "PropertyTable" element contains the parameter of the SV 310, and the "ConflictRule" element contains the constraint processing rule. The "PropertyTable" element has two sub-elements: a "ValueInfoTable" element and a "ReasonInfoTable" element in which the value and the reason are defined, respectively. In the "ValueInfoTable" element, each value in the list of values is described in a "ValueSet" element. The value of each of the "ValueSet" elements may additionally store data to be added to the value as a "Property" element. For example, in order to add information about paper size "A4", such as the width and the height, the "Property" elements are used. The default value in the list of values is described in a "DefaultValue" element. In FIG. 4, two values, namely, "Collated" and "Uncollated", are described and the description that the "Collated" value is set in default is included. Further, three reasons are described as "ReasonSet" elements in the "ReasonInfoTable" element. In a "Conflict" element, one constraint processing rule is described in a "ConflictRules" element. Each constraint processing rule has a priority which is described in an attribute called "priority". The constraint processing rules are evaluated in the order from that having the smallest priority value. Thus, the smaller the value, the higher the priority. In this manner, a priority is set for each SV 310 in order to perform constraint processing at the time of simultaneous input. When a value to be input as a print setting is in the constraint state and one of the pair of values is to be changed, the value of the function having a higher priority is preferentially set. Accordingly, print setting can be performed as desired by the user. In a case where no priority exists, depending on the order of evaluating the constraint processing rules, a function that is evaluated earlier is prioritized. Thus, the same results are not always obtained. The "Conflict" element has a "Value" element and a "Condition" element, and the "Value" element contains a value that varies as a result of constraint. In the "Conflict" element, a status that varies as a result of constraint can be described using a "status" attribute. The "Condition" element contains the name and value of the SV 310 to be subjected to the constraint processing. The "name" attribute contains the name of the target SV 310, and the "Value" element contains the value of the target SV 310. Parallel description of "Condition" elements means an AND operation ("AND") therebetween. Other arithmetic operation functions may also be used: a "result" attribute of "false" means negation ("NOT"), a "Block" element represents a bracket, and an "AnyOneCondition" element represents an exclusive OR operation ("OR"). In FIG. 4, three constraint processing rules are included: If the value of the "bookbinding" SV 310, "Booklet", is other than "None", "Collated" is set so that the status of the SV 310 is set to "NotAvailable". When the front cover setting "CoverFront" and the back cover setting "CoverBack" are other than "NoCover", that is, when those settings are specified, "Collated" is set so that the status of the SV 310 is set to "NotAvailable". When the stapling setting "Staple" is set to "SaddleStitch" indicating a saddle stitch, "Collated" is set so that the status of the SV 310 is set to "NotAvailable".

Figure 5:
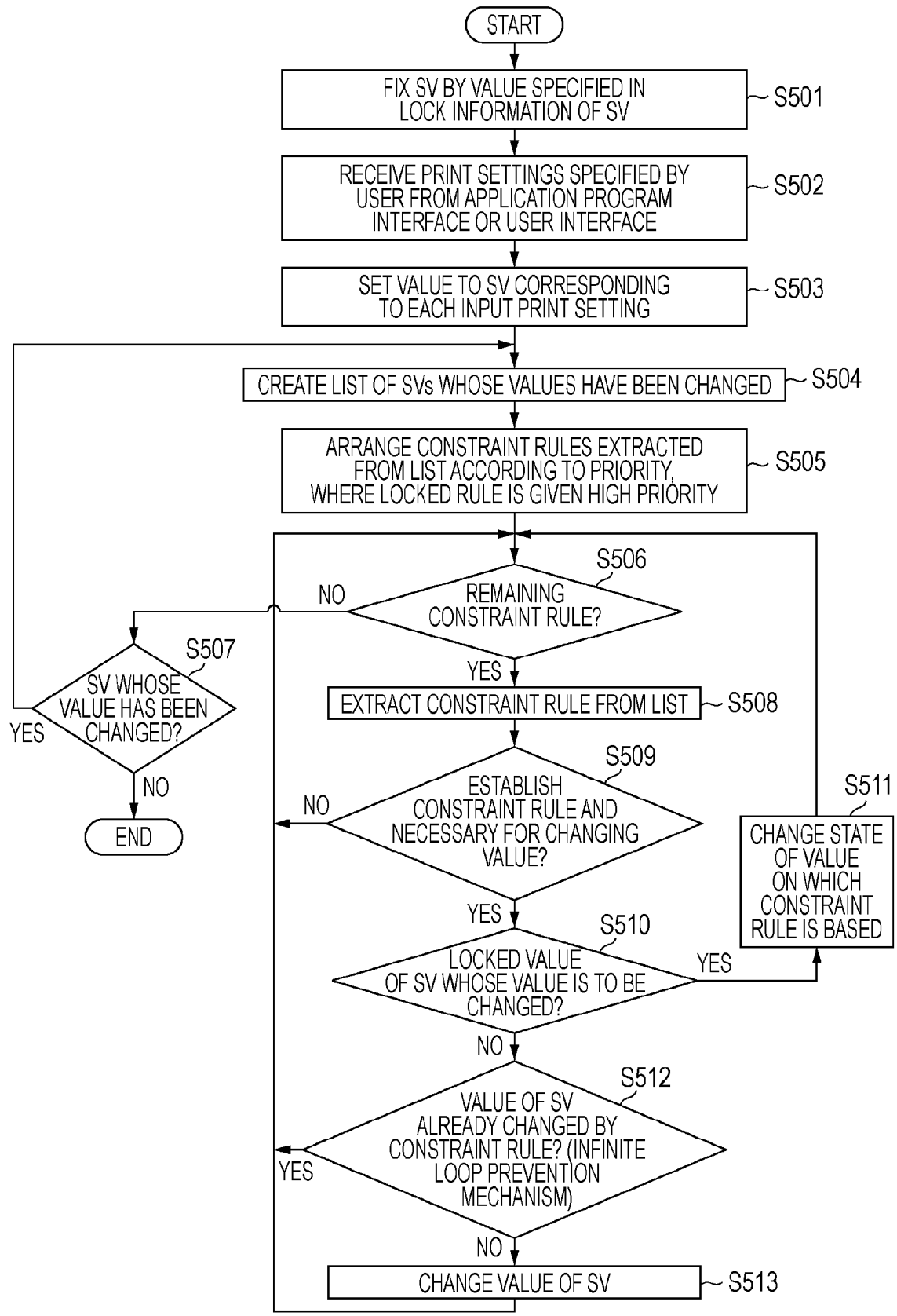
FIG. 5 is a flowchart showing a constraint processing logic performed by a constraint engine according to the first embodiment of the present invention.

FIG. 5 shows a process that is started when a user instructs a printer driver to perform setting. The processing of step S501 is confirmed each time. However, the processing may be performed in advance. In this case, when the user changes a print setting, the process is performed after step S502.

Next, the constraint processing logic performed by the constraint engine 306 in the conflict engine 304 will be described in accordance with a flowchart shown in FIG. 5. First, the constraint engine 306 acquires information about the lock function (hereinafter referred to as "lock information") for the SVs 310 from the API 302 or the user interface 303. Based on the lock information, the constraint engine 306 changes the value of the target SV 310 to a value to be locked, and sets a lock flag (step S501). The constraint engine 306 further changes the default value to a value to be locked.

Then, in step S502, the API 302 or the user interface 303 receives print setting information specified by the user from a print setting such as a DEVMODE structure or print ticket or control input through the user interface (step S502). The API 302 or the user interface 303 creates a list of values of SVs 310 to be changed on the basis of the received print setting information. The list may be created according to a table having combinations of pairs of names and values of the SVs 310 and pieces of print setting information. The table is described in an XML file, and the XML file is contained in the model-dependent file 307. The constraint engine 306 changes the current values of the corresponding SVs 310 to the print setting values on the basis of the list of values (step S503). Here, the constraint engine 306 creates a list of SVs 310 whose values have been changed (step S504). Although a list has already been created based on the values of print settings, here a list of SVs 310 whose values have successfully been changed is created. Further, during the processing of a constraint processing rule, the constraint engine 306 creates a list including both SVs 310 whose values have been actually changed and SVs 310 whose values have been changed as a result of the constraint processing rule. The constraint engine 306 extracts all the constraint processing rules of the SVs 310 included in the list created in step S504, and arranges the extracted constraint processing rules according to the priority (step S505). If there are locked SVs 310, the constraint engine 306 first arranges the constraint processing rule of the locked SVs 310 according to the priority, and then arranges the other constraint processing rules according to the priority. If there is a remaining constraint processing rule that is arranged according to the priority (step S506), the constraint engine 306 extracts one constraint processing rule (step S508). Then, the constraint engine 306 evaluates the constraint processing rule. The constraint engine 306 refers to the value or property of the SV 310 described in the constraint processing rule, and determines whether the rule is established while matching the "Condition" element in the constraint processing rule. If the constraint processing rule is established, the constraint engine 306 determines whether it is necessary to change the value of the SV 310 (step S509). If it is necessary to change the value, the constraint engine 306 determines whether a lock flag has been set on the basis of the lock information (step S510). If the value is locked, the constraint engine 306 changes the value of the SV 310 included in the "Condition" element in the constraint processing rule so that the status is changed to "not-available" (step S511). Normally, the constraint engine 306 changes the value on the basis of the value of the target SV 310 described in the constraint processing rule. When the value is locked, however, the constraint engine 306 operates so as to change the status of the target SV 310. When the value is not locked, the constraint engine 306 is to perform normal constraint processing to change the value in accordance with the constraint processing rule. In this case, the constraint engine 306 determines whether a flag has been set as to whether the value of the target SV 310 to be changed has already been changed by the constraint processing (step S512). The constraint processing is triggered by changing the value, and the constraint engine 306 evaluates the constraint processing rule. However, if the value is changed many times, depending on the constraint processing rule, an evaluation loop is formed to prevent the processing of the constraint engine 306 from being completed. Accordingly, a design rule is limited so that the value of the SV 310 can be changed up to once according to a constraint processing rule, thereby preventing the formation of an infinite loop. If it is confirmed that the value has not yet been changed, the constraint engine 306 changes the value of the SV 310, and sets a flag indicating that the value of the SV 310 has been changed according to the constraint processing rule (step S513). Then, the constraint engine 306 evaluates a next constraint processing rule. If no constraint processing rule remains, the constraint engine 306 determines whether there is an SV 310 whose value has been changed by constraint processing (step S507). If no value has been changed, the constraint engine 306 determines that all the values are stable as a result of the evaluation of all the constraint processing rules, and ends the process. If a value has been changed, the constraint engine 306 extracts all constraint processing rules of SVs 310 whose values have been changed, and arranges the extracted constraint processing rules according to the priority for reevaluation. Also in this case, the constraint engine 306 places a high priority on an SV 310 that is locked.

Therefore, the configuration module 301 can completely fix a function using the conflict engine 304 and the lock function of the SVs 310. In constraint processing, furthermore, the constraint engine 306 operates so that no conflict occurs.

Second Embodiment

FIG. 9 is a block diagram of a system that implements a configuration module that is different from that in the first embodiment. The difference from the first embodiment is a constraint processing rule. In a constraint processing rule according to the first embodiment, the constraint engine 306 describes a given value, which is to be changed, on the basis of a target value. In a constraint processing rule according to a second embodiment of the present invention, a combination of values that cannot be simultaneously set is described. Thus, a different logic is provided for a conflict engine to perform constraint processing. However, an equivalent lock function is realized by rearrangement of priorities.

In FIG. 9, a configuration module 903 is a common module that can be used for different printers. Data dependent on each printer is described in a text file called Generic Description Language (GPD) file. A GPD parser 904 in the configuration module 903 interprets the GPD file and operates so that an operation unique to a printer can be realized. In FIG. 9, the operation of a printer A is performed when a GPD file 901 corresponding to the printer A is read, and the operation of a printer B is performed when a GPD file 902 corresponding to the printer B is read. Since it is not efficient for the GPD parser 904 to read a GPD file each time a printer driver is used, a binary file is created and saved when a GPD file is read. Thereafter, unless the description of the GPD file is changed, the operation is performed using the binary file. Therefore, high-speed operation can be realized.

In FIG. 9, when the GPD file 901 corresponding to the printer A is read, binary data 906 is created; when the GPD file 902 corresponding to the printer B is read, binary data 907 is created. Based on the data described in the GPD file, the configuration module 903 creates an object instance for each function, and performs constraint processing. Print setting data supplied from an application 910 is passed to the configuration module 903 through COMPSTUI.DLL 909. A print setting on a user interface is passed to the configuration module 903 through a common user interface (UI) 905. The configuration module 903 reflects the print setting in the object instance for each function, and performs constraint processing to return the print setting to the application 910 or the user interface. The configuration module 903 is further capable of adding a new function as desired using a user interface plug-in 908.

FIG. 10 shows a part of the description of a GPD file. "*Feature" describes the name of a function. In FIG. 10, a paper feed tray of a printer is defined as a feature named "InputBin". "*Option" represents a value corresponding to a function. In FIG. 10, four options exist, namely, "AUTO", "INPUTTRAY_MANUAL", "INPUTTRAY_CASSETTE1", and "INPUTTRAY_CASSETTE2", one of which is selected as the current value of "InputBin". "*DefaultOption" describes which option is set in default. Here, "AUTO", that is, automatic selection of a paper feed tray, is set in default.

There are two constraint processing rules: "*Constraints" and "*InvalidConbination". "*Constraints" describes a constraint for preventing the simultaneous combination of an option of a given feature and an option of another feature. "*InvalidConbination" is described at the root of the GPD file (at the beginning of a row), and describes constraints between options of features. Two or more constraints between options can be described in "*InvalidConbination", which is different from "*Constraints". Further, "*ConflictPriority" describes the priority of the feature. The smaller the number, the higher the priority. That is, a constraint processing rule having a higher priority is evaluated earlier. The configuration module 903 reads such a GPD file to create a feature object and performs constraint processing.

Each feature further has a flag indicating whether the feature is locked in order to fix an option. When the feature is locked, the option can be prevented from being changed. Whether the feature is locked can also be described in advance in the feature in the GPD file (see FIG. 12).

The constraint processing logic performed by the configuration module 903 will now be described in accordance with a flowchart shown in FIG. 11. If the application 910 or a user interface of the common UI 905 has lock information about a feature, an option of a specified feature is set, and a lock flag is set (step S1101). The configuration module 903 performs the following operations unless otherwise stated.

Further, the "Default Option" value is changed to the option to be locked. Then, the configuration module 903 receives print setting information specified by the user from the application 910 or the user interface of the Common UI 905 (step S1102). At this time, no option is set in the feature. All features are listed and are arranged according to the "ConflictPriority" values (step S1103).

Here, if there are locked features, the configuration module 903 arranges the locked features according to the "ConflictPriority" values, and then arranges normal features according to the "ConflictPriority" values. If there is a remaining feature in the list (step S1104), a feature is extracted from the list (step S1105). The configuration module 903 refers to all the "Constraints" or "InvalidConbination" elements to determine whether the option of the feature corresponding to the specified print setting value, that is, the option to be set, is the target of the "Constraints" or "InvalidConbination" element, (step S1106).

If the option is the target, this means that the option is in the constraint state and the print setting cannot be set to the option as the current value of the feature. Thus, the configuration module 903 proceeds to a next feature. If the option is not in the constraint state, the configuration module 903 determines whether the option of the current feature is locked (step S1107).

If the current option is locked, this also means that the print setting cannot be set as an option. Thus, the configuration module 903 proceeds to a next feature. If the option to be changed is not in the constraint state and if the current option is not locked, the option is set as the value of the print setting in the feature (step S1108). When the process is completed for all the features, the configuration module 903 ends the process.

Accordingly, a function can be fixed by locking a feature. The second embodiment provides a simpler mechanism for fixing a function and an easier implementation of constraint processing. In the constraint processing according to the second embodiment, however, it is difficult to change another value by changing a certain value. Thus, when a print setting is in the constraint state, a user changes the setting so as to cancel the constraint state and then resets the value.

Other possible print settings for which fixing can be instructed may include a password-based confidential printing setting and a user name or date printing setting. When such print settings are fixed, the saving (mail box) or preferential printing (a certain print job is interrupted and a later print job is preferentially printed) setting is turned off when the secure printing setting is fixed. A process for turning off the poster printing setting when the user name or date printing setting is fixed works. The term "printer memory" means a memory provided in a printer. The term "user interface screen" means a screen on a user interface.

A technical principle of the present embodiment will now be summarized.

A computer configured to process a print setting in a printer driver for generating data to be sent to and printed from the printer 214, which is an example of a printing device, has been disclosed. Then, constraint rules that define constraints for print settings are stored in an external storage device. Then, an instruction for fixing a print setting is given using a user interface of the printer driver or using an XML file. Further, a configuration module increases the priority of a constraint rule associated with a print setting for which fixing has been instructed. This is an example of a rule priority setting.

The values of print settings are stored as objects in the external storage device.

The configuration module changes the value of an object according to a constraint processing rule, and evaluates the constraint processing rules according to the priority. The print setting for which fixing has been instructed is prevented from being changed by an input from the user interface or by executing a constraint processing rule. Further, when a constraint processing rule for changing a value of an object for which fixing of the value has been instructed is processed, the configuration module can prevent the value of an object that causes the value to be changed from being selected through the user interface of the printer driver.

The user interface of the printer driver controls a process for displaying a print setting for which fixing has been instructed on a monitor in a distinguishable manner as shown in, for example, FIG. 7.

The priorities of constraint processing rules are determined by the vendor. However, it is useful for a user to change constraint processing as desired using the mechanism according to the present embodiment. It is preferable that a user be able to give an instruction for fixing the duplex printing setting, the 2-Up printing setting, the monochrome printing setting, the saving (mail box) setting, or the like using the user interface or an XML file. The mail box is a box provided in a memory of a printer or a multifunction peripheral for storing print data or the like which has been sent from a personal computer (PC). Depending on the setting, printing and output can be prohibited and print data can be always saved in the mail box.

Furthermore, when a document given by other user has a print setting "postcard", a user may print the document without being conscious about the setting of "postcard". In this case, it is more useful that the document be printed in A4 size and on both sides than that the document cannot be printed. Further, if the saving (mail box) setting is fixed, the specified sheet size is modified from "user-defined sheet (roll sheet)" to "A4". In an existing process, a print is made on a roll sheet. Thus, the always-saving setting would prevent unnecessary use of paper resources. In other words, a roll sheet is not available in this environment. Further, in another embodiment of the present invention, if a setting that violates the saving-in-mail-box setting exists, the printing operation may be terminated without storing print data in the mail box and the administrator may be notified. Here, it is assumed that the saving-in-mail-box setting is a setting concerning printing.

A design may also be available in which when the 2-Up printing setting is fixed, the bookbinding setting is changed to the "OFF" state. A semi-fixing mode may also be available. That is, when the bookbinding setting is available, the bookbinding setting is made and the 2-Up printing setting is not adopted, and when the bookbinding setting is not available on the printer specification, the 2-Up printing setting is fixed.

Other Embodiments

Figures 11, 12:
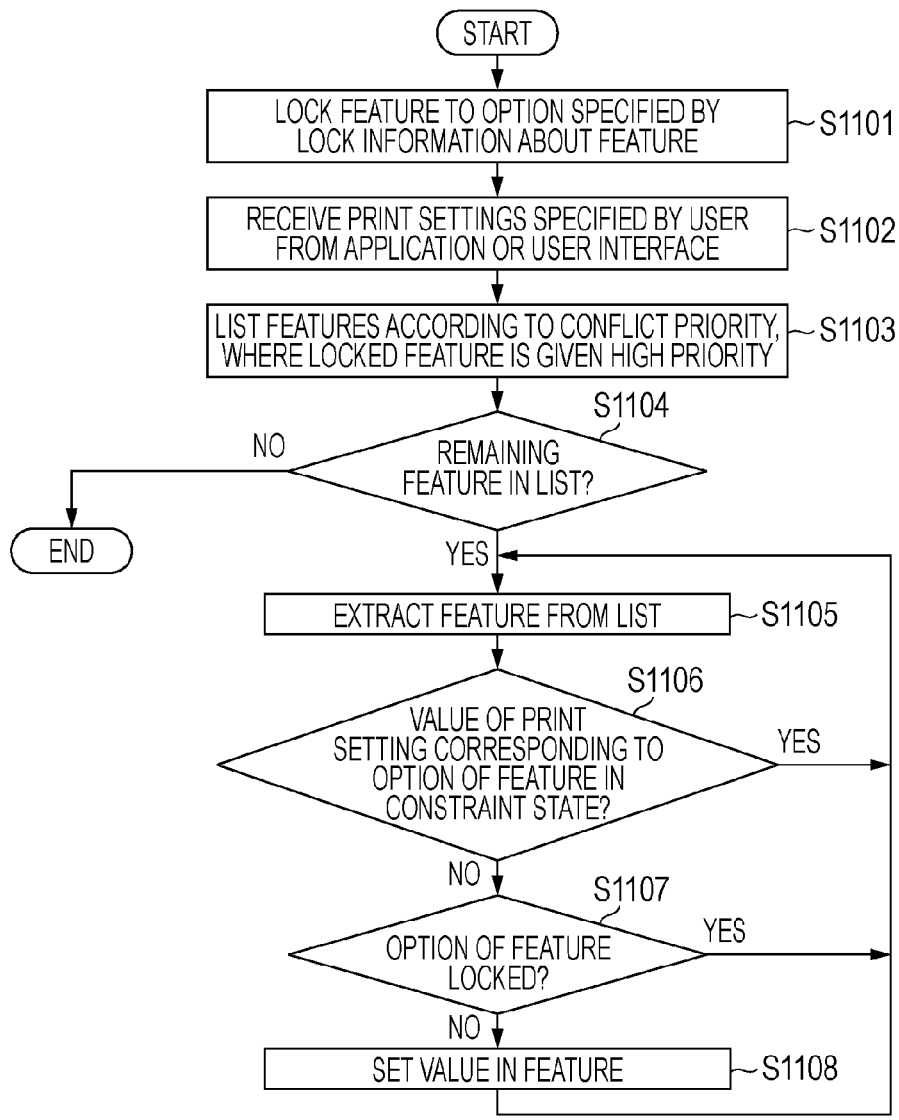
FIG. 11 is a flowchart showing constraint processing performed by the configuration module according to the second embodiment of the present invention.
FIG. 12 is a diagram showing a part of a GPD file in which the lock function is active in the model-dependent file according to the second embodiment of the present invention.

The processes according to the foregoing embodiments shown in FIGS. 5 and 11 are performed by a computer according to a program installed from outside. The present invention can also be applied in a case where an information group including the program is supplied from an external storage medium to a host computer through a storage medium such as a compact disk read-only memory (CD-ROM), a flash memory, or a flexible disk or floppy disk (FD) or via a network.

The features of the present invention can also be achieved by, as described above, supplying a storage medium storing program code of software implementing the functions of the foregoing embodiments to a system or an apparatus or downloading the storage medium from an external server (not shown) to thereby cause a computer (or a CPU or a microprocessing unit (MPU)) of the system or apparatus to read and execute the program code stored in the storage medium.

In this case, the program code read from the storage medium implements a new function of the present invention, and the storage medium storing this program code can constitute an embodiment of the present invention. Examples of the storage medium for providing program code may include a floppy disk, a hard disk, an optical disk, a magneto-optical disk, a digital versatile disk (DVD), a CD-ROM, a magnetic tape, a non-volatile memory card, a ROM, and an electrically erasable programmable read-only memory (EEPROM).

The present invention may also include other embodiments. In addition to the realization of the functions of the foregoing embodiments by executing program code read by a computer, an OS or the like running on the computer may perform some or all actual processes according to an instruction of the program code, thereby realizing the functions of the foregoing embodiments. Furthermore, the program code read from the storage medium may be written in a memory provided in a function expansion board inserted into the computer or a function expansion unit connected to the computer, and thereafter a CPU or the like provided in the function expansion board or function expansion unit may perform some or all actual processes according to an instruction of the program code, thereby realizing the functions of the foregoing embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-205617, filed Aug. 8, 2008, which is hereby incorporated by reference herein in its entirety.

The invention claimed is:

1. An information processing apparatus comprising:
a setting screen display unit configured to display a print setting screen to set, to valid or invalid, a function to store data in a printer for each individual job;
a display unit configured to display a reception screen for receiving an instruction whether to enable the function to store data in a printer for all print jobs; and
an instruction unit configured to receive, via the reception screen, the instruction to enable the function to store data in a printer for all print jobs,
wherein the setting screen display unit displays the print setting screen in a state where the function to store data in a printer for each individual job is always set to valid and a change of the function from valid to invalid cannot be accepted, in a case where the instruction unit receives the instruction to enable the function to store data in a printer for all print jobs, wherein the reception screen is provided by a printer driver, and wherein the print setting screen is for setting of each individual job and the reception screen is for setting of all print jobs.

2. An information processing method for an information processing apparatus, the information processing method comprising:

a setting screen display step configured to display a print setting screen to set, to valid or invalid, a function to store data in a printer for each individual job;

a display step of displaying a reception screen for receiving an instruction whether to enable the function to store data in a printer for all print jobs; and an instruction step of receiving, via the reception screen, the instruction to enable the function to store data in a printer for all print jobs, wherein the setting screen display step displays the print setting screen in a state where the function to store data in a printer for each individual job is always set to valid and a change of the function from valid to invalid cannot be accepted, in a case where the instruction step receives the instruction to enable the function to store data in a printer for all print jobs, wherein the reception screen is provided by a printer driver, and wherein the print setting screen is for setting of each individual job and the reception screen is for setting of all print jobs.

3. A non-transitory computer-readable medium storing a control program for causing a computer to execute the method according to claim 2.

4. The information processing apparatus according to claim 1, wherein the printer is a multifunction peripheral.

5. The information processing apparatus according to claim 1, wherein the print setting screen is provided by the printer driver.

6. The information processing apparatus according to claim 1, wherein the instruction unit receives the instruction to enable the function to store data in a printer for all print jobs from a user having given authority.

7. The information processing apparatus according to claim 1, wherein the display unit displays information indicating that setting of the function to store data in a printer for each individual job is fixed, and wherein an item for the function to store data in a printer for each individual job is a grayed out item which does not receive a change.

8. The method according to claim 2, wherein the printer is a multifunction peripheral.

9. The method according to claim 2, wherein the print setting screen is provided by the printer driver.

10. The method according to claim 2, wherein the instruction step receives the instruction to enable the function to store data in a printer for all print jobs from a user having given authority.

11. The method according to claim 2, wherein the display step displays information indicating that setting of the function to store data in a printer for each individual job is fixed, and wherein an item for the function to store data in a printer for each individual job is a grayed out item which does not receive a change.

12. An information processing method comprising:

a setting screen display step configured to display a print setting screen to set, to valid or invalid, a function to store data in a printer for each individual job;

a display step of displaying a reception screen for receiving an instruction whether to enable the function to store data in a printer for all print jobs; and an instruction step of receiving, via the reception screen, the instruction to enable the function to store data in a printer for all print jobs, wherein the setting screen display step displays the print setting screen in a state where the function to store data in a printer for each individual job is always set to valid and a change of the function from valid to invalid cannot be accepted, in a case where the instruction step receives the instruction to enable the function to store data in a printer for all print jobs, wherein the reception screen is provided by a printer driver, and wherein the print setting screen is for setting of each individual job and the reception screen is for setting of all print jobs.

13. The method according to claim 12, wherein the printer is a multifunction peripheral.

14. The method according to claim 12, wherein the print setting screen is provided by the printer driver.

15. The method according to claim 12, wherein the instruction step receives the instruction to enable the function to store data in a printer for all print jobs from a user having given authority.

16. The method according to claim 12, wherein the display step displays information indicating that setting of the function to store data in a printer for each individual job is fixed, and wherein an item for the function to store data in a printer for each individual job is a grayed out item which does not receive a change.

17. The storage medium according to claim 3, wherein the printer is a multifunction peripheral.

18. The storage medium according to claim 3, wherein the print setting screen is provided by the printer driver.

19. The storage medium according to claim 3, wherein the instruction step receives the instruction to enable the function to store data in a printer for all print jobs from a user having given authority.

20. The storage medium according to claim 3, wherein the display step displays information indicating that setting of the function to store data in a printer for each individual job is fixed, and wherein an item for the function to store data in a printer for each individual job is a grayed out item which does not receive a change.

21. A non-transitory computer-readable storage medium storing a program for causing a computer to execute:

a setting screen display step configured to display a print setting screen to set, to valid or invalid, a function to store data in a printer for each individual job;

a display step of displaying a reception screen for receiving an instruction whether to enable the function to store data in a printer for all print jobs;

an instruction step of receiving, via the reception screen, the instruction to enable the function to store data in a printer for all print jobs, wherein the setting screen display step displays the print setting screen in a state where the function to store data in a printer for each individual job is always set to valid and a change of the function from valid to invalid cannot be accepted, in a case where the instruction step receives the instruction to enable the function to store data in a printer for all print jobs, wherein the reception screen is provided by a printer driver, and wherein the print setting screen is for setting of each individual job and the reception screen is for setting of all print jobs.

22. The storage medium according to claim 21, wherein the printer is a multifunction peripheral.

23. The storage medium according to claim 21, wherein the print setting screen is provided by the printer driver.

24. The storage medium according to claim 21, wherein the instruction step receives the instruction to enable the function to store data in a printer for all print jobs from a user having given authority.

25. The storage medium according to claim 21, wherein the display step displays information indicating that setting of the function to store data in a printer for each individual job is fixed, and wherein an item for the function to store data in a printer for each individual job is a grayed out item which does not receive a change.

26. The information processing apparatus according to claim 1, wherein the function to store data in a printer is a box saving function.

27. The information processing apparatus according to claim 1, wherein the reception screen receives an instruction for a selected function from among a plurality of functions including a duplex printing function.

28. The method according to claim 2, wherein the function to store data in a printer is a box saving function.

29. The method according to claim 2, wherein the reception screen receives an instruction for a selected function from among a plurality of functions including a duplex printing function.

30. The method according to claim 12, wherein the function to store data in a printer is a box saving function.

31. The method according to claim 12, wherein the reception screen receives an instruction for a selected function from among a plurality of functions including a duplex printing function.

32. The storage medium according to claim 21, wherein the function to store data in a printer is a box saving function.

33. The storage medium according to claim 21, wherein the reception screen receives an instruction for a selected function from among a plurality of functions including a duplex printing function.

34. The information processing apparatus according to claim 1,
wherein information indicating validity of the function to store data in a printer for each individual job is displayed on the print setting screen, in a case where the instruction unit receives the instruction to enable the function to store data in a printer for all print jobs.

35. The information processing apparatus according to claim 1,
wherein the print setting screen is displayed with an option for the function, in a case where the instruction unit receives the instruction to enable the function to store data in a printer for all print jobs.

36. The method according to claim 2,
wherein information indicating validity of the function to store data in a printer for each individual job is displayed on the print setting screen, in a case where the instruction step receives the instruction to enable the function to store data in a printer for all print jobs.

37. The method according to claim 2,
wherein the print setting screen is displayed with an option for the function, in a case where the instruction step receives the instruction to enable the function to store data in a printer for all print jobs.

38. The method according to claim 12,
wherein information indicating validity of the function to store data in a printer for each individual job is displayed on the print setting screen, in a case where the instruction step receives the instruction to enable the function to store data in a printer for all print jobs.

39. The method according to claim 12,
wherein the print setting screen is displayed with an option for the function, in a case where the instruction step receives the instruction to enable the function to store data in a printer for all print jobs.

40. The storage medium according to claim 21,
wherein information indicating validity of the function to store data in a printer for each individual job is displayed on the print setting screen, in a case where the instruction step receives the instruction to enable the function to store data in a printer for all print jobs.

41. The storage medium according to claim 21,
wherein the print setting screen is displayed with an option for the function, in a case where the instruction step receives the instruction to enable the function to store data in a printer for all print jobs.

* * * * *